UNITED STATES PATENT OFFICE.

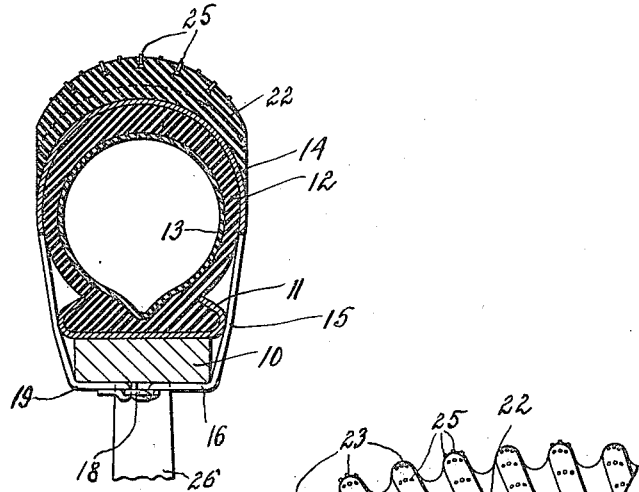
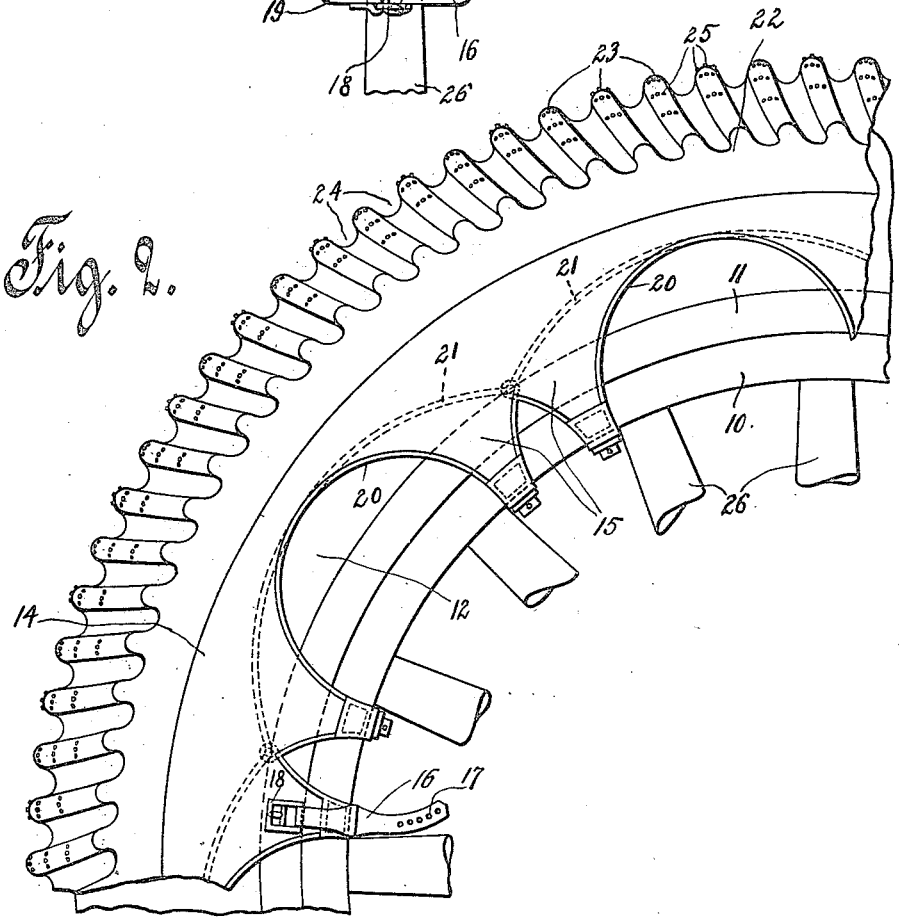

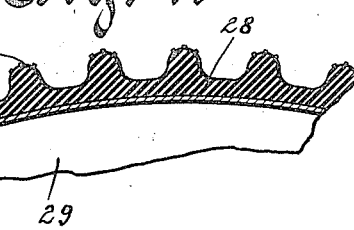
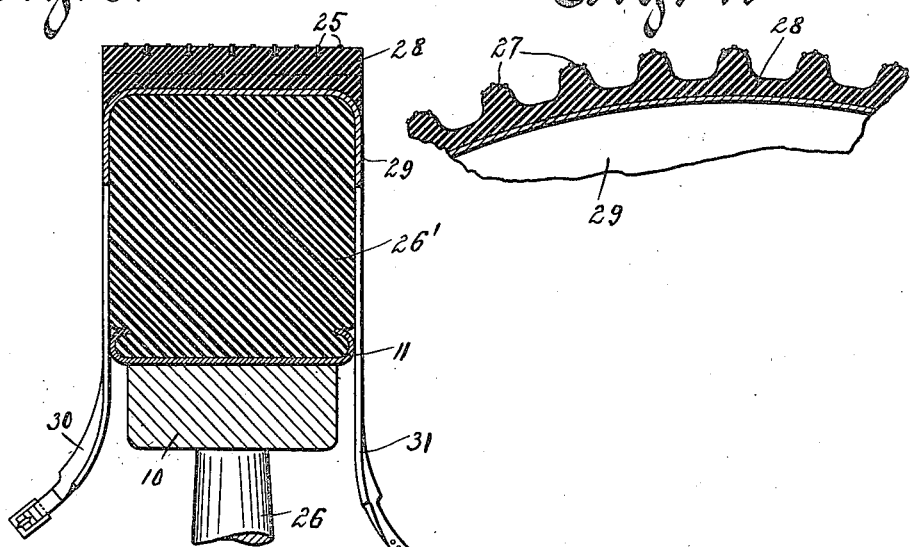
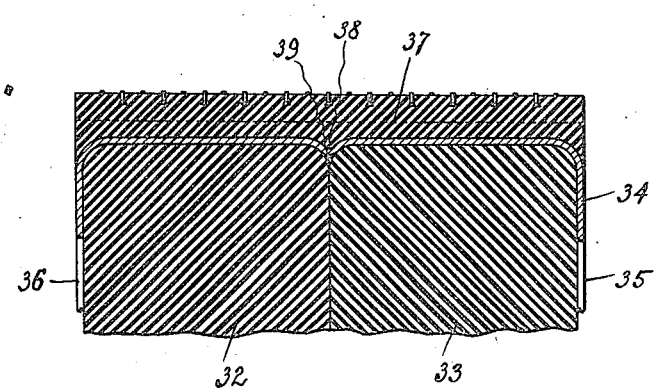

SÁNDOR HORVÁTH, OF NEW YORK, N. Y., ASSIGNOR OF ONE-HALF TO SÁNDOR ZSEMBERY, OF NEW YORK, N. Y.

ATTACHMENT FOR VEHICLE-WHEELS.

1,150,597.   Specification of Letters Patent.   Patented Aug. 17, 1915.

Application filed May 12, 1914. Serial No. 838,100.

*To all whom it may concern:*

Be it known that I, SÁNDOR HORVÁTH, a subject of the King of Hungary, and resident of the city of New York, in the county of New York and State of New York, have invented certain new and useful Improvements in Attachments for Vehicle-Wheels, of which the following is a specification.

The present invention relates to an attachment for vehicle wheels which can be employed in conjunction with those provided with either pneumatic or solid tires.

One of the objects of the invention is to provide an attachment for vehicle wheels for the purpose of increasing the traction or driving action of the wheels when the vehicle is traveling over road-beds that are covered with mud or snow.

Another object of the invention is to provide a device of the character mentioned that prevents the wheels from skidding or slipping sideward when the vehicle is traveling over slippery pavements.

With these and other objects in view, which will more fully appear as the nature of the invention is better understood, the same consists in the combination, arrangement and construction of parts hereinafter fully described, pointed out in the appended claim and illustrated in the accompanying drawings, it being understood that many changes may be made in the size and proportion of the several parts and details of construction within the scope of the appended claim without departing from the spirit or sacrificing any of the advantages of the invention.

A few of the many possible embodiments of the invention are illustrated in the accompanying drawings, in which:—

Figure 1 is a transverse cross sectional view through a tire of the pneumatic type with the attachment applied thereto; Fig. 2 is a side elevation showing a portion of a vehicle wheel with the attachment thereon; Fig. 3 is a cross sectional view through a wheel having a solid tire and the attachment fitted thereto; Fig. 4 is a longitudinal section taken through a portion of the attachment shown in Fig. 3; and Fig. 5 is a cross sectional view taken through a modification of the device shown in Fig. 3.

Referring now more particularly to Figs. 1 and 2, the numeral 10 indicates the felly of a wheel, that is provided with a rim 11, the latter supporting a pneumatic tire, consisting of an outer shoe or casing 12 and the inner tube 13. The attachment comprises a sheath 14 of a suitable fabric or leather, such sheath being formed in a continuous piece or band and encircling the entire outer portion of the tire. Flaps 15, 15 are arranged at suitable intervals upon both sides of the sheath, said flaps being either made integral with the same or they may be attached thereto in any suitable manner. The flaps on one side of the sheath are disposed in registering position with those upon the other side thereof. To the flaps on one side of the sheath are attached straps or flexible bands 16, each being provided with a row of holes 17. These straps are adapted to coöperate with buckles 18, that are carried by straps or flexible bands 19, the latter being secured to the flaps on the other side of the sheath. To strengthen the flaps, their edges are provided with cords or similar means 20, these cords being interlaced with cords 21, that are in any suitable manner fastened to the sheath above the flaps. To the tread surface of the sheath is secured a solid resilient ring, made, for instance, of rubber, and denoted by the numeral 22, its peripheral or tread portion being curved to conform to the peripheral portion of the tire. In order to insure a firm grip of the rubber ring and to prevent skidding, the tread portion of the ring 22 is transversely corrugated, that is to say it is provided with transversely extending alternate ridges 23 and furrows 24, from said ridges projecting at intervals studs 25, which are adapted to grip the ground in a well known manner so as to prevent skidding.

In forming the attachment, the studs 25 are embedded in the rubber ring 22 and the latter attached, preferably in a mold, by vulcanization to the sheath 14.

In applying the attachment to a vehicle wheel, the sheath is drawn around the tire and the straps or flexible bands 16 engaged with their corresponding buckles 18 in the usual manner. The attachment is thus held firmly upon the wheel, " creeping " being prevented inasmuch as the straps abut against the spokes 26 of the wheel. The transversely extending ridges 23 and their studs 25 insure a firm grip by the wheels upon muddy or snow covered road-beds, and also on slippery pavements. Injury to the tire is effectively prevented, inasmuch as the sheath incloses a substantial portion of said tire in contradistinction to the chain type anti-skidding devices, which are objectionable for the reason that they cover only strips of the tire, wear away the covered parts and, upon breaking, seriously interfere with the mud guard or fenders of the motor vehicles.

A modification of the invention is shown in Figs. 3 and 4 of the drawings. In these figures the rim 11 of the wheel is provided with a solid tire 26′, that is substantially rectangular in cross section, and consequently the ridges 27 upon the rubber ring 28 are straight in the transverse direction. The rubber ring is attached to a sheath 29, the latter having straps 30 and 31 secured thereto in the same manner as the corresponding elements shown in Fig. 1 of the drawings are fastened to the sheath 14. Wheels of the type shown in Fig. 3 of the drawings are mostly used upon trucks where slight vibration is not objectionable, and for this reason the corrugations 27 may be spaced farther apart than in the device shown in Figs. 1 and 2 of the drawings.

In Fig. 5 of the drawings a further modification of the invention is illustrated. In this modification two solid tires 32 and 33 are mounted side by side upon the wheel to provide a large tread surface. Over these tires is drawn a sheath 34, having flaps 35 and 36, by means of which the said sheath is attached to the wheel. A rubber ring 37 is secured in the manner above described to the sheath 34, the central portion of this ring having an inwardly extending ridge 38 which fits into a groove 39, that is formed between the two abutting tires 32 and 33. Otherwise the construction and operation of this device is identical with the one described in connection with Figs. 3 and 4 of the drawings.

What I claim is:—

The combination with a vehicle wheel and its tire, of a sheath encircling the tire and substantially covering the outer portion thereof, means for securing said sheath to said wheel, and a resilient ring forming the tread portion of said sheath, said ring being provided with transversely extending alternate ridges and furrows, each ridge being curved to conform to the peripheral portion of said tire and also out of the radial plane placed through the center of the wheel and the base of the ridge.

Signed at New York, in the county of New York and State of New York, this 1st day of May, A. D. 1914.

SÁNDOR HORVÁTH.

Witnesses:
SÁNDOR ZSEMBERY,
SIGMUND HERZOG.